(12) United States Patent  (10) Patent No.: US 8,135,594 B2
Beardall et al.  (45) Date of Patent: Mar. 13, 2012

(54) LIMITING PROXY SUBSCRIPTION PROPAGATION IN A PUBLISH/SUBSCRIBE MESSAGE BROKER NETWORK

(75) Inventors: Gavin David Beardall, Alresford (GB); Andrew David Banks, Romsey (GB); Adrian David Dick, Southampton (GB); Martyn Honeyford, Bretton (GB)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 12/355,336

(22) Filed: Jan. 16, 2009

(65) Prior Publication Data

US 2009/0182574 A1  Jul. 16, 2009

(30) Foreign Application Priority Data

Jan. 16, 2008 (EP) .................................... 08150321

(51) Int. Cl.
*G06Q 10/00* (2006.01)
(52) U.S. Cl. ........................................................ 705/1.1
(58) Field of Classification Search ........................ None
See application file for complete search history.

(56) References Cited

U.S. PATENT DOCUMENTS

2003/0046395 A1 * 3/2003 Fleming et al. ............... 709/226
* cited by examiner

Primary Examiner — Jonathan Ouellette
(74) Attorney, Agent, or Firm — Novak Druce + Quigg LLP (57) ABSTRACT

In a method of controlling a network of interconnected publish/subscribe message brokers for routing publications from a plurality of publishers to interested subscribers, each message broker is arranged to receive publications from publishers both directly and via other brokers and to receive subscriptions and unsubscriptions from subscribers and other brokers for publications meeting predefined criteria identified in the subscriptions or unsubscriptions. Each broker creates and manages a list correlating subscribers with the predefined criteria. It then matches received publications with the subscription list and forwards publications which match listed subscriptions which are in an active state to interested subscribers and interested other brokers in the list. Also, in response to received subscriptions and unsubscriptions, each broker generates and forwards proxy subscriptions and proxy unsubscriptions to other brokers. Each broker establishes a retention period for subscriptions. Then, in response to receipt of an unsubscription from a subscriber or a proxy unsubscription from another broker, it retains the corresponding subscription in a retained state for the retention period. During the retention period, matching publications will not be forwarded to the subscriber or other broker and no proxy unsubscriptions will be forwarded to other brokers. A new subscription for the same matching publications as the retained subscription during the retention period causes a reversion of the retained subscription to its active state. Propagation of proxy subscriptions and unsubscriptions is thus reduced in dependence on the duration of the retention period.

20 Claims, 7 Drawing Sheets

LIMITING PROXY SUBSCRIPTION PROPAGATION IN A PUBLISH/SUBSCRIBE MESSAGE BROKER NETWORK

CROSS-REFERENCE TO RELATED APPLICATION

This application claims the benefit of EP Patent Application No. 08150321.1, filed on Jan. 16, 2008, which is incorporated by reference herein in its entirety.

FIELD OF THE INVENTION

The present invention relates to a Publish/Subscribe message broker arrangement and method for limiting the propagation of proxy subscriptions generated by the broker when interconnected in a network of similar brokers.

BACKGROUND OF THE INVENTION

A "Publish/Subscribe" system is a type of messaging application in which the providers of information (publishers) are decoupled from the consumers of that information (subscribers) by means of a broker. Typically, in such a system, a number of publishers publish messages to a broker on particular topics (e.g. news, weather, sport). Subscribers register their interest in such topics via subscription requests received at the broker. For example, a subscriber may request to receive any information published on the weather, whilst another subscriber may desire information on the news and sport. Publishers are not concerned with where their publications are going and subscribers are not interested in where the messages they receive have come from. Instead, the broker manages the distribution of the messages to make sure that they arrive at the correct destination according to the valid subscriber/topic pairs registered in a subscription list held by the broker. The broker also ensures that messages are distributed in the correct format and validates the authority of each publisher to publish to the subscribers which have subscribed to the particular topic encompassing the message.

In general terms, a publisher generates a message that it wants to publish and defines the topic of the message. The broker retrieves the message from its input node and passes it to a publication node for distribution to all subscribers that have registered an interest. Distribution of messages to subscribers may either be by point-to-point broadcast from the broker or may be by multi-casting. In the latter case, messages on particular topics are distributed to intermediate shared addresses which are provided to all the subscribers that have registered an interest in the particular topic so that they can listen in for newly published information.

When subscribers no longer have an interest in a given topic, they issue an "unsubscribe" request to the broker which then removes the subscriber/topic pair from its subscription list.

In larger systems, multiple brokers constitute the nodes of a larger, heterogeneous network. Topic information from publishers may enter the system at any of the brokers and be passed onward to other brokers through communication channels between the nodes of the system. As in the case of a single broker, each broker has its own subscribers which subscribe to it for information published on one or more topics defined in the subscriptions. These are registered in a subscription list, which lists local subscribers with currently active subscriptions and the topics to which they subscribe.

In multi-broker publish/subscribe systems, two distinct and complementary methodologies are known for dealing with publications and subscriptions, as passed between brokers. These are known as "publish-everywhere" and "proxy-subscription forwarding". In the publish-everywhere methodology, publications and subscriptions are broadcast to every broker at every node in the network. In proxy subscription forwarding, on the other hand, a broker indicates to neighbouring brokers that it has subscribers for a particular topic. The neighbouring brokers do not know the identity of these subscribers but add the name of the forwarding broker and the topic concerned as a matched pair to their subscription lists along with their own local subscriptions. Thus, when data on the requested topic is published to the neighbouring broker, it knows to send the data on to the forwarding broker, as well as to its local subscribers, but does not send it to other brokers, not in its subscription list. Thus, proxy subscriptions may be regarded as filters for required topics.

Both of these approaches have different advantages and disadvantages which depend on the particular traffic throughput and the demands of both the publishers and subscribers that are active at a particular time. A fixed and specific choice between the two approaches may not always be optimal for a given configuration as it is not able to change to cope with the continuously varying demands of both publishers and subscribers. The disadvantages of each choice are as follows: If proxy-subscription forwarding is used then fast changing subscriptions cause large volumes of messages creating and deleting proxy-subscriptions to propagate throughout the whole network. This occurs particularly when a subscriber repeatedly unsubscribes and resubscribes to a topic. On the other hand, if a publish-everywhere approach is chosen then there will more than likely be large numbers of unwanted messages delivered to destinations that have no actual subscribers. Both techniques will thus waste network bandwidth in certain circumstances.

Published US Patent Application 2003/0135556 (S. Holdsworth et al.), assigned to IBM Corporation, shows the use of both broadcast and of proxy subscription filtering in a network of message brokers. Filtering policy between two or more brokers can be switched whenever network communication characteristics show that it would be more efficient to use broadcast than proxy forwarding or vice versa. A switching threshold between the two policies may be determined by measuring such network characteristics as the frequency of subscribe and unsubscribe requests or a count of the number of redundant messages. Another alternative is to look at delivery delays between brokers and their causes. Generally speaking, a dynamic switching policy is determined based on the set of messages being sent by one broker to another. If one broker decides to change policy, it informs the other of its decision.

The solution proposed by US 2003/0135556 is effective in reducing network traffic but does require complex knowledge of and measurements to be made on at least two brokers and the communication channel between them. It does not offer a stand alone solution, self contained within one broker. It also requires an explicit switch between broadcast and proxy subscription policies on a given threshold.

SUMMARY OF THE INVENTION

Accordingly, the present invention provides a publish/subscribe message broker for routing publications from a plurality of publishers to interested subscribers, the broker being capable of interconnection in a network of similar brokers and including: means for receiving publications from publishers both directly and via other brokers; control means for receiving subscriptions and unsubscriptions from subscribers and from other brokers in the network for publications meeting predefined criteria identified in the subscriptions or unsubscriptions to create and manage a list correlating subscribers with the predefined criteria; a matching engine for comparing received publications with the subscription list and forwarding publications which match listed subscriptions which are in an active state to interested subscribers and interested other brokers in the list; and means responsive to received subscriptions and unsubscriptions to generate and forward related proxy subscriptions and proxy unsubscriptions to other brokers, wherein the control means is responsive to receipt of an unsubscription from a subscriber or a proxy unsubscription from another broker to retain the corresponding subscription in a retained state for a retention period during which matching publications will not be forwarded to the subscriber or other broker and no proxy unsubscriptions will be forwarded to other brokers, a new subscription for the same matching publications as the retained subscription during the retention period causing a reversion of the retained subscription to its active state, whereby propagation of proxy subscriptions and unsubscriptions is reduced in dependence on the duration of the retention period.

In a second aspect, the invention provides a method of controlling a network of interconnected publish/subscribe message brokers for routing publications from a plurality of publishers to interested subscribers, each message broker being arranged to receive publications from publishers both directly and via other brokers and to receive subscriptions and unsubscriptions from subscribers and other brokers for publications meeting predefined criteria identified in the subscriptions or unsubscriptions, the method comprising the steps of, for each broker: creating and managing a list correlating subscribers with the predefined criteria; matching received publications with the subscription list and forwarding publications which match listed subscriptions which are in an active state to interested subscribers and interested other brokers in the list; and in response to received subscriptions and unsubscriptions to generating and forwarding proxy subscriptions and proxy unsubscriptions to other brokers; wherein the method further comprises: establishing a retention period for subscriptions; in response to receipt of an unsubscription from a subscriber or a proxy unsubscription from another broker, retaining the corresponding subscription in a retained state for the retention period during which matching publications will not be forwarded to the subscriber or other broker and no proxy unsubscriptions will be forwarded to other brokers; and in response to a new subscription for the same matching publications as the retained subscription during the retention period causing a reversion of the retained subscription to its active state, whereby propagation of proxy subscriptions and unsubscriptions is reduced in dependence on the duration of the retention period.

This method may be implemented by a computer program executed in a data processing system comprising such a network of message brokers.

Thus, unnecessary network traffic is reduced by employing proxy forwarding to reduce redundant publication while at the same time inhibiting repeated generation of and propagation of proxy subscriptions and unsubscriptions for a defined retention period. A need for this may arise in a highly volatile subscription scenario in which there is a need for frequent monitoring of a property or value, susceptible to change. The retention period is set or chosen to optimize the balance between the number of redundant publications received by and the number of proxy subscriptions sent out by the broker.

Thus the performance of a single broker in a network can be individually determined and adjusted.

Also, unlike the prior art above, no explicit switching between two modes of operation is required. Instead, the performance of a proxy forwarding system automatically approaches that of a broadcast system as the length of the retention period increases.

The retention period can be designed as a fixed period or can be made adjustable, e.g., by a systems administrator, for a particular system configuration or session of operation. However, it is preferred that the retention period is dynamically adjustable during operation of the broker in response to measured characteristics.

Preferably, the retention period is increased in response to the frequency of proxy subscriptions received by the broker and decreased in response to the frequency of receipt of redundant publications not corresponding to any active subscription.

It is also a preferred feature that there is a separate retention period for each subscription having unique predefined criteria, that is to say, a unique topic. This allows much finer tuning of the performance of the broker than using the same retention period, adjustable or otherwise, for all subscriptions.

It is preferable that the retention period can be adjusted, dynamically or otherwise, in a range from zero to a period sufficiently long that all publications are published to all brokers.

BRIEF DESCRIPTION OF THE DRAWINGS

The present invention will now be described, by way of example only, with reference to preferred embodiments thereof, as illustrated in the accompanying drawings. It is expressly noted, however, that the invention is not limited to the precise arrangements and instrumentalities shown.

DETAILED DESCRIPTION

Figure 1:
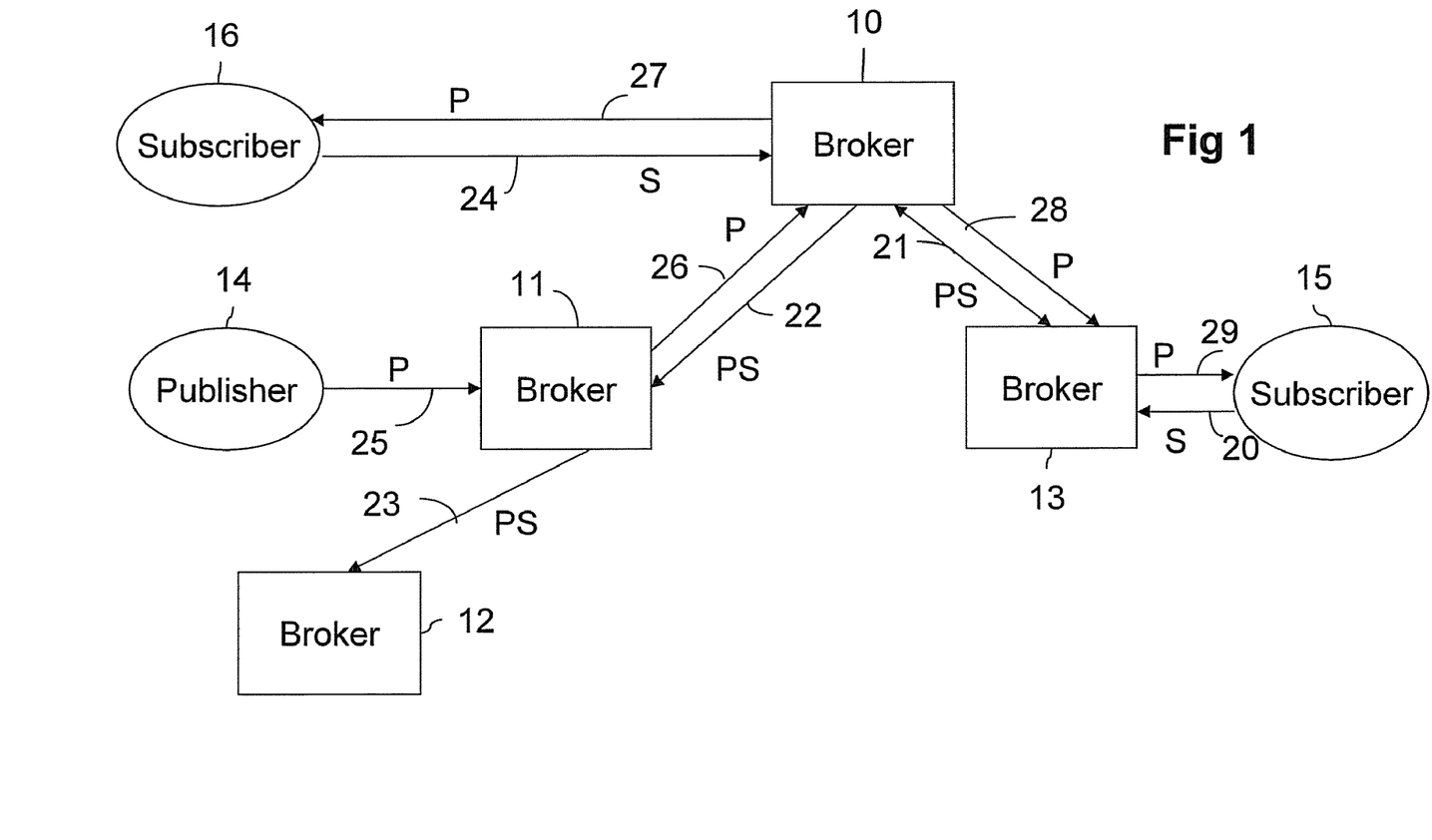
FIG. 1 shows a multi-broker publish/subscribe system employing proxy subscription forwarding, known in the prior art.

In FIG. 1, there is shown a simple example of a known multi-broker publish/subscribe system such as is employed in the messaging and queuing product IBM WebSphere MQ Version 6.0 from International Business Machines Corporation ("IBM" and "WebSphere" are trademarks of International Business Machines Corporation). The illustrated system employs proxy subscription forwarding.

Four publish/subscribe message brokers 10 to 13 form the nodes of a network. For simplicity, it is assumed that there is just a single publisher 14 and two subscribers 15 and 16. It is also assumed that the publisher 14 publishes data on a given topic, X, and that both of subscribers 15 and 16 subscribe to this topic.

Initially, subscriber 15 registers a subscription S over line 20 for the given topic with broker 13 which creates an entry in a subscription list associating subscriber 15 with topic X. A proxy subscription PS for topic X is then forwarded over line 21 by broker 13 to its neighbouring brokers, in this case just broker 10. Broker 10 creates an entry in its subscription list associating broker 13 with topic X. In turn, broker 10 forwards a further proxy subscription PS on to broker 11 over line 22 and broker 11 forwards yet another proxy subscription PS on to broker 12 over line 23. In this way, the original subscription for topic X is forwarded to all other brokers in the network.

The second subscriber 16 also registers a subscription S for the same topic X with its local broker 10 over line 24. A proxy subscription is sent from broker 10 to broker 13, over line 21, which causes broker 13 to create a subscription list entry associating broker 10 with topic X so that it is aware that a subscription other than that from subscriber 15 exists elsewhere on the network. Broker 10 does not need to forward another proxy subscription for topic X to broker 11, however, as it has already sent one.

When publisher 14 publishes a publication P on topic X to broker 11 on line 25, a matching engine within the broker determines from an inspection of the subscription list that there is an active proxy subscription from broker 10. It, therefore, passes the publication to broker 10 on line 26. It does not, however, pass the publication P to broker 12 as it has no proxy subscription from broker 12 for topic X.

Broker 10, in turn, sends the publication P on topic X directly to its local subscriber 16 on line 27 and, at the same time, sends it on to broker 13 on line 28, from which it has a proxy subscription. Finally, item P is passed to subscriber 15 on line 29 to complete the chain of publication.

It will be recognized that the use of the term "line" does not imply a dedicated hard-wired connection and that, in general, it refers to any path through an appropriate communications channel. In the case of the IBM WebSphere MQ product, transmitted data, or "messages", are put on queues at the target nodes and removed by applications at the nodes, asynchronously, as needed.

Returning to FIG. 1, it can be seen that the use of proxy subscriptions is more selective than if item P had simply been broadcast to every broker on the network, although, in this simple example, the only saving is in not sending it to broker 12. In general, however, broadcast or "publish-everywhere" of an item to all brokers would result in many redundant items being sent to brokers which had no registered subscribers for that item.

However, proxy subscription forwarding also can create excessive network traffic. In the illustrated example, this can be understood by considering what happens when a subscriber such as subscriber 15, subscribes and unsubscribes repeatedly for the same topic X. This could arise in a situation requiring frequent but unpredictable monitoring of a data source.

Unsubscriptions—or deregistrations—are propagated in the same way as subscriptions and result, conventionally, in the registered subscription being removed from the broker's subscription list. If a subscriber, such as subscriber 15, deregisters from topic X, the unsubscription is propagated throughout the network in the same way as the original subscription. When received by another broker, it causes the removal of the corresponding proxy subscription entry from the other broker's subscription lists. A resubscription for topic X then results in a repeat of the original propagation to other brokers and so on. So, in certain circumstances, excess network traffic may be created by the use of proxy subscription forwarding.

In a conventional multi-broker publish/subscribe system employing proxy subscription forwarding, subscriptions have only two states "Active" and "Inactive". This is illustrated in the state diagram of FIG. 2 which shows the permissible transitions between the two states of a subscription held by a broker in response to all possible system events. The Active state is represented by the circle 30 and the inactive state by the circle 31.

Figure 2:
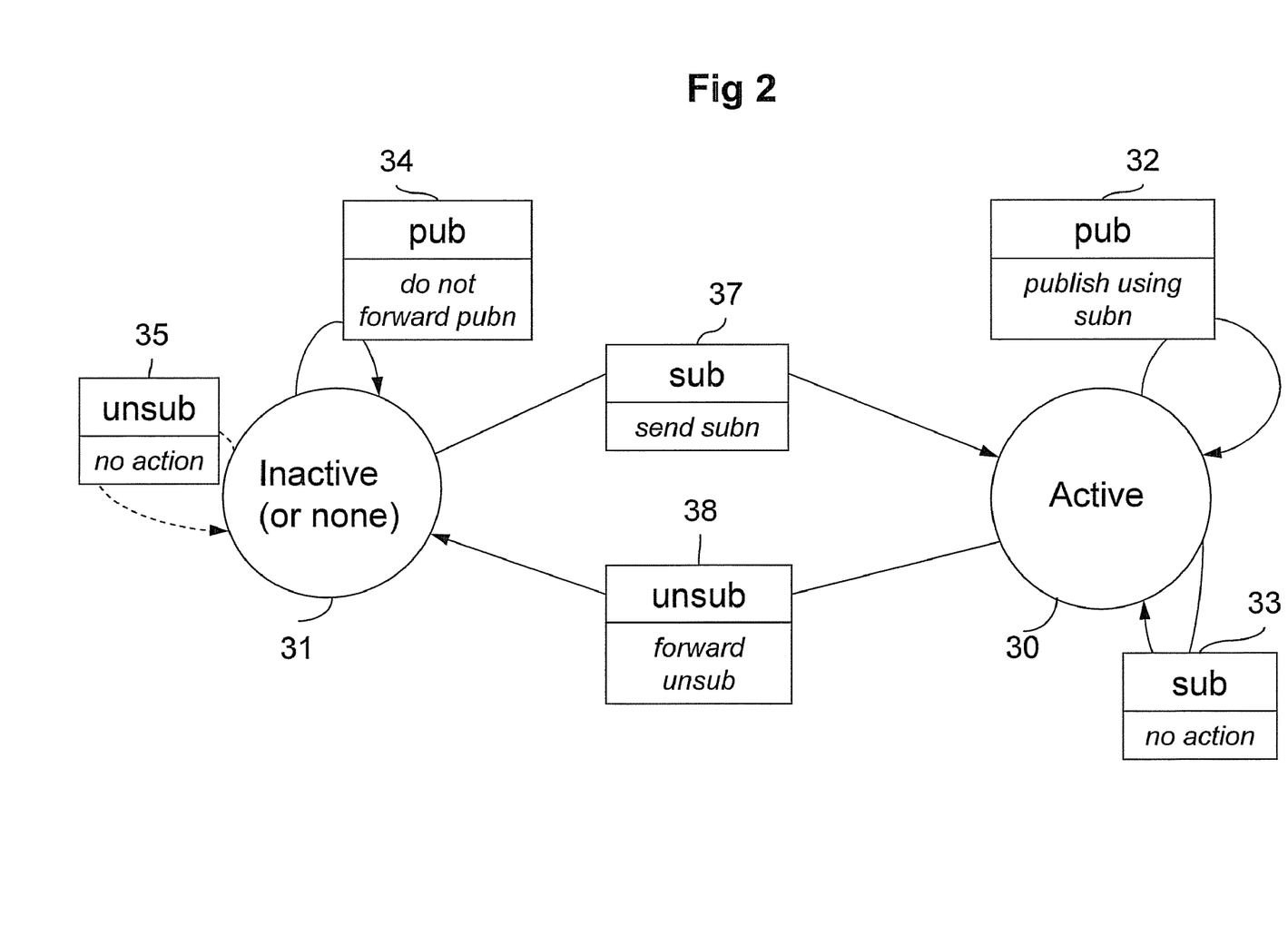
FIG. 2 is a subscription state diagram for the known system of FIG. 1.

Rectangles in the diagram show, in their upper half, an event, and in their lower half a consequent action. Thus, considering the Active state first, a publication received by the broker, as shown by box 32, will be published to registered subscribers for that topic in the broker's subscription list. This, of course, includes other brokers which have registered proxy subscriptions as well as local subscribers. If a further subscription for the same topic is received from the same subscriber, as shown in box 33, no action results as the subscription is already registered.

If the subscription is inactive or does not even exist, then an incoming publication, as shown in box 34, is not forwarded by the broker. Also an unsubscription received, as shown in box 35, produces no action as the status for that topic at that broker is inactive or non-existent.

Transitions between the two states are produced by the events represented by boxes 37 and 38. Box 37 represents the result of an incoming new subscription to a broker, where no active subscription already exists. This creates an Active subscription in the broker's subscription list, represented by the illustrated transition to Active state 30. The resulting action is that the new subscription is sent on, that is to say forwarded, as a proxy subscription to other brokers.

The other state transition shown is from Active to Inactive and is the result of an unsubscribe request being received by the broker, as shown in box 38. The resulting action is to render the subscription inactive at the broker and to forward the unsubscribe request on as a proxy to neighbouring brokers.

Figure 3:
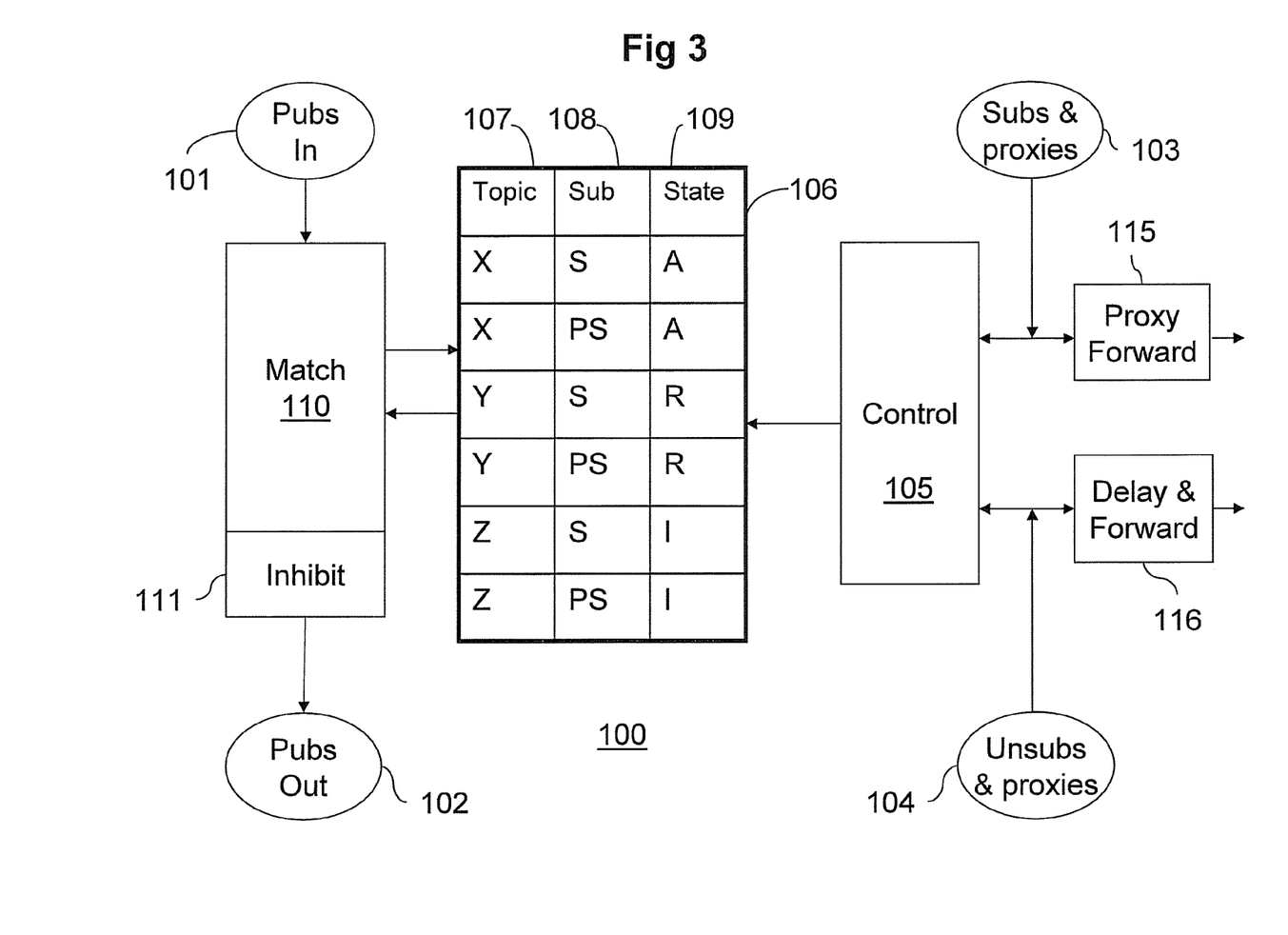
FIG. 3 is a block diagram of a publish/subscribe message broker employing retained subscriptions according to the present invention.

FIG. 3 shows the functional components of one publish/subscribe message broker 100 for implementing the invention. The broker 100 is designed to be one of a network of brokers such as that illustrated in FIG. 1, but handles publications and subscriptions or unsubscriptions differently, as will be explained further.

Broker 100 is in receipt of incoming publications at 101. These may be directly from publishers or forwarded on by other brokers of the network. Outgoing publications from 102 are forwarded to local subscribers or other brokers which are registered with broker 100.

These registered subscriptions and proxy subscriptions are shown as being input to the broker at 103. Unsubscriptions and proxy unsubscriptions are provided at 104. It is convenient for ease of explanation to show subscriptions and unsubscriptions being input from separate locations on separate lines but this is purely for clarity of explanation.

The subscriptions and proxy subscriptions from input 103 are provided to a controller 105 which creates and manages a subscription list 106. The subscription list 106 contains conventional topic/subscriber (or proxy subscriber) pairs in columns 107 and 108. For illustrative purposes only, subscriptions on three topics X, Y and Z are shown in column 107 while in column 108 corresponding subscribers S or proxy subscribers, that is to say other brokers of the network, PS, are identified. In the right hand column 109, a subscription state:

Active (A), Retained (R) or Inactive (I) is shown. The purpose of these states will become clear shortly.

A matching engine 110 receives publications on various topics through input 101. The engine compares the topic with those stored in subscription list 106. If the publication topic matches a subscription or proxy subscription whose status is active, then, as in a conventional broker, the matching engine provides the publication to the listed subscriber or broker at output 102. However, if the listed subscription status is R or I, the publication is inhibited by a gate component 111 and not forwarded to the corresponding subscriber or broker.

Returning now to the input subscriptions and proxies from input 103, receipt of these causes further proxies to be created in component 115 and forwarded on to neighbouring brokers. This is entirely conventional.

Unsubscriptions and proxy unsubscriptions from input 103, unlike in the conventional broker (see FIG. 2), do not immediately cause the listed subscriptions to be removed. Rather, they cause them to be put into a "retained" state R by marking the subscription list entry appropriately. In this state, for a defined retention period, publications on the topics concerned will be prevented from being published by inhibit gate 111. Additionally, proxy unsubscriptions to other brokers will be delayed for the duration of the retention period and only forwarded at the end of that period by component 116.

In this way, propagation of proxies, both for subscription and unsubscriptions, may be limited so as to reduce network traffic, for example, in situations where one or more subscribers repeatedly subscribes and unsubscribes to a topic. The retention period in this example is assumed to be fixed but adjustable by an administrator in dependence on the behaviour of the network.

When the retention period expires, the subscription enters an Inactive state I and, at this point, the unsubscription proxies are sent via output 116.

A resubscription for the topic while the listed subscription is in the Retained state simply results in the listed status being returned to Active and normal publish/subscribe operation resumes. Because the unsubscription proxies have been delayed, there is no need to send out new proxy subscriptions to other brokers, as they will not have received the proxy unsubscriptions and will still have the appropriate topic/subscriber pairs in their subscription list. So if other brokers which have received proxy subscriptions receive publications on the proxy topic, there will be some redundant publication traffic back to the original broker but, by selecting an appropriate retention period, this can be kept in balance in comparison with the reduction in proxy propagation.

A resubscription while the topic is in the Inactive state is effectively the same as a completely new subscription. It, therefore, causes new proxy subscriptions to be forwarded via output 115 while at the same time the subscription list is amended to change its status to Active.

In fact, for a fixed duration retention period, there is little point in having an Inactive state and the subscription list entry could just as well be removed entirely. However, the Inactive state is of use in an alternative dynamically controlled retention period to be described below.

Before moving on to this alternative, it should be noted that some of the components of the broker 100 of FIG. 3 may be implemented as modules of computer program code and as data structures and their illustration as separate blocks is conceptual only to indicate the different functions.

The alternative of dynamic control of the retention period employs a tuning heuristic that dynamically optimises delivery within interconnected publish/subscribe systems by implementing a variable subscription retention period. This, as already described, is the time that a subscription is kept active but in a Retained state after all of its subscribers have disconnected from a particular topic (normally all subscriptions are immediately deleted from the system as soon as all subscribers have disconnected by propagating an unsubscribe message to all nodes).

If the subscription retention period equals zero then the network exhibits full proxy-subscription forwarding behaviour; subscriptions are deleted immediately after all subscribers have disconnected from that particular topic and messages are only delivered to nodes that have active local subscribers or proxy-subscriptions. If the retention period is very large then a publish everywhere type of behaviour predominates (after the initial subscriptions have been made). This is because the subscriptions are never deleted so there is no need to send out new proxy-subscriptions but messages are sent everywhere (that a subscriber has existed at one time or another) within the network, irrespective of whether there is an actual subscriber at this time. So by heuristically tuning the retention period between these extremes it is possible to dynamically tune the system behaviour between the two delivery methods at each point in the network to obtain optimum performance. This alternative embodiment of the invention effectively allows a continuously variable choice to be made between the two publication strategies which are then able to adapt to varying loads by examining the traffic at a given point rather than having to collate a set of statistics from all over the whole network. Each node is tuned individually and is able to act in isolation. This method balances the behaviour of the publish everywhere and proxy-subscription forwarding methodologies so as to get the benefits of both but is able to dynamically adapt to the system's workload between the two in such a way as to make use of the best of both approaches.

By using the concept of subscription retention period, which is the time a subscription is kept after its subscription has been cancelled, this single tuneable parameter can be used to select or determine the overall behaviour, which can be easily controlled and is simple to adjust. A heuristic function at each node measures the cost of making a subscription and the cost of delivering publications to a node that has no subscribers (a redundant-publication). Redundant-publications are those publications that are received by a node when it has no local subscribers and no proxy-subscriptions.

An example of a heuristic function that could be implemented at each node might be one that simply increases the subscription's retention period by a small amount each time the subscription is remade and conversely, decreases it each time a redundant-publication is processed. The amount of increase or decrease would be quite small so that the changes take place over a fairly long period of time and this would provide a degree of damping to the system so that it does not exhibit unstable or chaotic behaviour. This allows the retention period to be ratcheted up or down over a period of time so that it accommodates network loads but does not respond too quickly.

If many subscriptions are processed, the retention period will be increased until there is no need to send out any more proxy-subscriptions as there will already be one in existence; that is, one retained from a previous subscription. This has the effect of delaying the onward sending of the unsubscribe message. If there are many redundant-publications then the retention period will be decreased until the number of redundant-publications is reduced to an acceptable level.

Each node continuously monitors the number of messages (redundant-publications and proxy-subscriptions) and adjusts the subscription's retention period so that the total cost of message delivery is heuristically minimised per node by implicitly comparing the cost of redundant-publications against the cost of sending out the proxy-subscriptions. More sophisticated heuristic functions could be used and the calculated cost might take into account the size of message or the message rates. Likewise, the actual increment might be fixed or be in proportion to the message size so that a more accurate cost could be factored in.

The subscription can be in one of the three states already discussed with respect to FIG. 3:
- active—messages being received for subscribers, active subscribers
- retained—messages being received for subscribers, no subscribers
- inactive—messages not being received for subscribers, no subscribers In the dynamic tuning implementation, however, a record needs to be maintained of the current retention period.

Even when a subscription has been marked inactive due to its retention period expiring it is not actually removed from the system. This is to allow the retention period to be continuously increased when its subscription is reactivated even if it is not currently high enough for it to be retained between successive subscription requests. If the subscription is remade, then the retention period of the subscription, which is currently marked as inactive, is recovered and used as the basis for the new value according to the algorithm used. In this way the last used retention period can be continuously increased each time it is reactivated. A subscription that is retained does not propagate the delete subscription flow to its neighbours until its retention period has expired. If a subscription is in the retained state, its retention period is still decreased when a publication is received.

An implementation of dynamic control of the retention period will now be described further with reference to the state diagram of FIG. 4 and flow diagram of FIG. 5, as appropriate.

Figure 4:
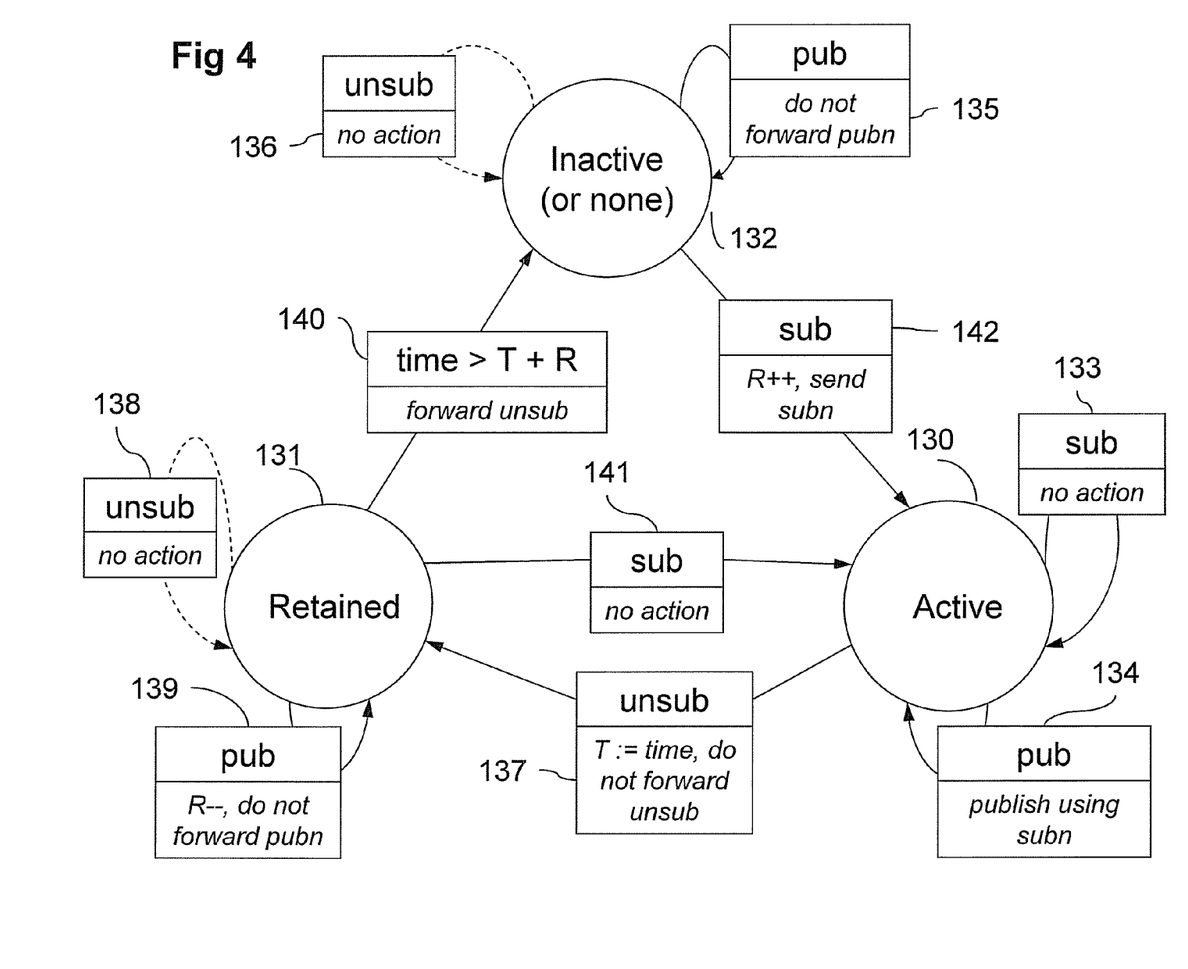
FIG. 4 is a subscription state diagram for a publish/subscribe message broker employing dynamic control of the subscription retention period according to the invention.

The transitions between the three states are shown in FIG. 4. The Active state is represented by circle 130, the Retained state by circle 131 and the Inactive state by circle 132. Several of the transitions from the Active and Inactive states are identical to those shown in FIG. 2. Thus a subscription received by the broker while in the Active state for an already listed subscription will result in no action, as shown in box 133. A publication received by the broker on the listed topic will be published to any listed subscribers or brokers for that topic, as represented by box 134. Similarly to FIG. 2, in the Inactive state, a publication received by the broker is not forwarded (box 135) and an unsubscription results in no action (box 136).

Unlike FIG. 2, however, if an unsubscription is received at the broker for an Active subscription, it is not removed or rendered inactive but is put into the retained state 131. The unsubscription is not forwarded and the current time T is recorded. These actions are shown in box 137. In the Retained state, as in the Inactive state, a further unsubscribe request initially results in no action (box 138). Also a publication received by the broker is not forwarded, as shown in box 139. However, the retention period R is decreased from its current value in order to alter the system performance towards increased proxy forwarding. When the retention period expires, at time>T+R, the unsubscription is forwarded to other brokers and the subscription state changes to Inactive, as shown by box 140.

Receipt of a further subscription from another subscriber or broker, while the listed subscription is in the Retained state, places the listed subscription back in the Active state (box 141). No new proxies need to be sent because, in the Retained state, they remain present in the neighbouring brokers, since unsubscriptions have been inhibited.

Only, when the retention period has expired and the subscription listed by the broker has been place in the Inactive state, are proxy subscriptions sent out, as indicated by box 142. This also causes the retention period R to be increased so the system performance is altered towards decreased proxy forwarding and tends towards publish everywhere behaviour.

It will be recognised that the described system never behaves totally in a publish-everywhere mode as publications are only ever sent to brokers and subscribers who have at some point registered an interest in the topic. What does happen, with a very long retention period is that these subscribers and brokers are almost never removed from the subscription lists, so that they receive publications irrespective of current interest in an approximation of publish everywhere behaviour.

It will be noted that the state diagram of FIG. 4 can also represent subscriptions in the broker of FIG. 3, that is, which use a fixed retention period R, if the increase (R++) and decrease (R--) actions are eliminated.

Figure 5:
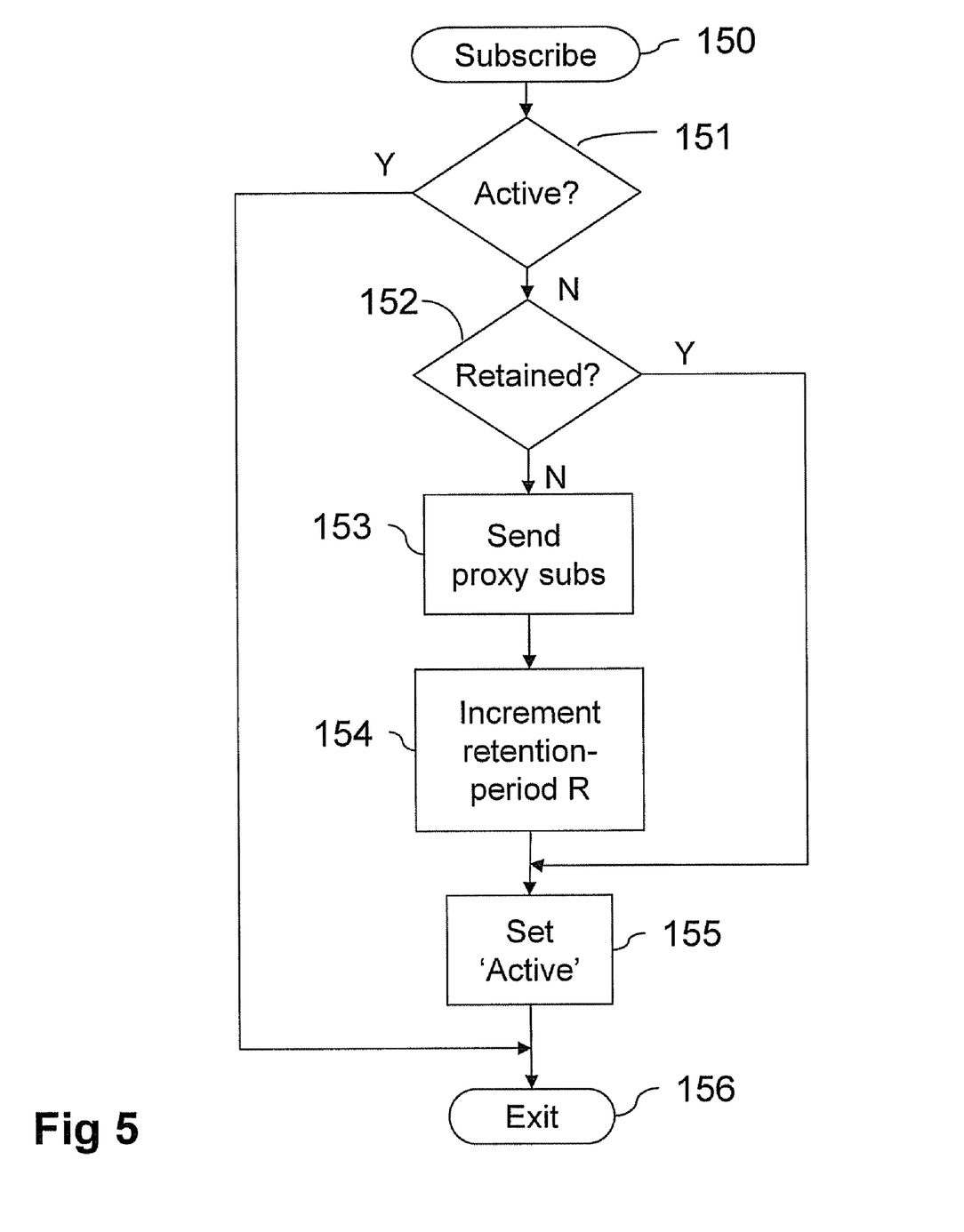
FIG. 5 is a flow diagram illustrating dynamic incrementing of the subscription retention period in response to received subscriptions.

The way in which subscriptions to a broker in a multi-broker network can be used to dynamically increment the subscription retention period is shown in more detail in the flow diagram of FIG. 5. The illustrated actions correspond to the state changes of boxes 133, 141 and 142 of FIG. 4. For this example, it is assumed that the retention period R for each topic subscription is set to zero when the topic is first defined.

When a subscribe request for a particular topic is received at input 150, the broker checks whether the identified subscription already exists. Firstly, in step 151, it is determined whether an Active subscription exists. If it does, there is no need for further action and control exits at exit 156. This step corresponds to box 133 in FIG. 4. In step 152, it is determined whether the subscription exists in the Retained state. If it does, then, corresponding to box 141 of FIG. 4, the state is set to "Active" in step 155.

If the subscription is Inactive or does not yet exist, then proxy subscriptions are forwarded to other brokers in step 153 and the retention period R is incremented in step 154. For this example, the increment is assumed to be one equal unit of time, for example, one minute. Following these actions which correspond to box 142 of FIG. 4, the state is changed to Active in step 155. Incrementing the retention period, as has been explained, alters the broker's performance towards publish-everywhere behaviour. It should be noted, that for dynamic tuning, a separate retention period is created for each topic subscription unlike the previous example, which assumed an identical retention period for all subscriptions. The current example therefore allows even finer tuning of performance as some subscriptions will benefit from a bias towards proxy subscription forwarding where others will be handled more efficiently if biased towards publish everywhere behaviour. The value of the retention period for subscriptions to each topic can be stored along with the subscription state indication in column 109 of list 106 in FIG. 3.

Figure 6:
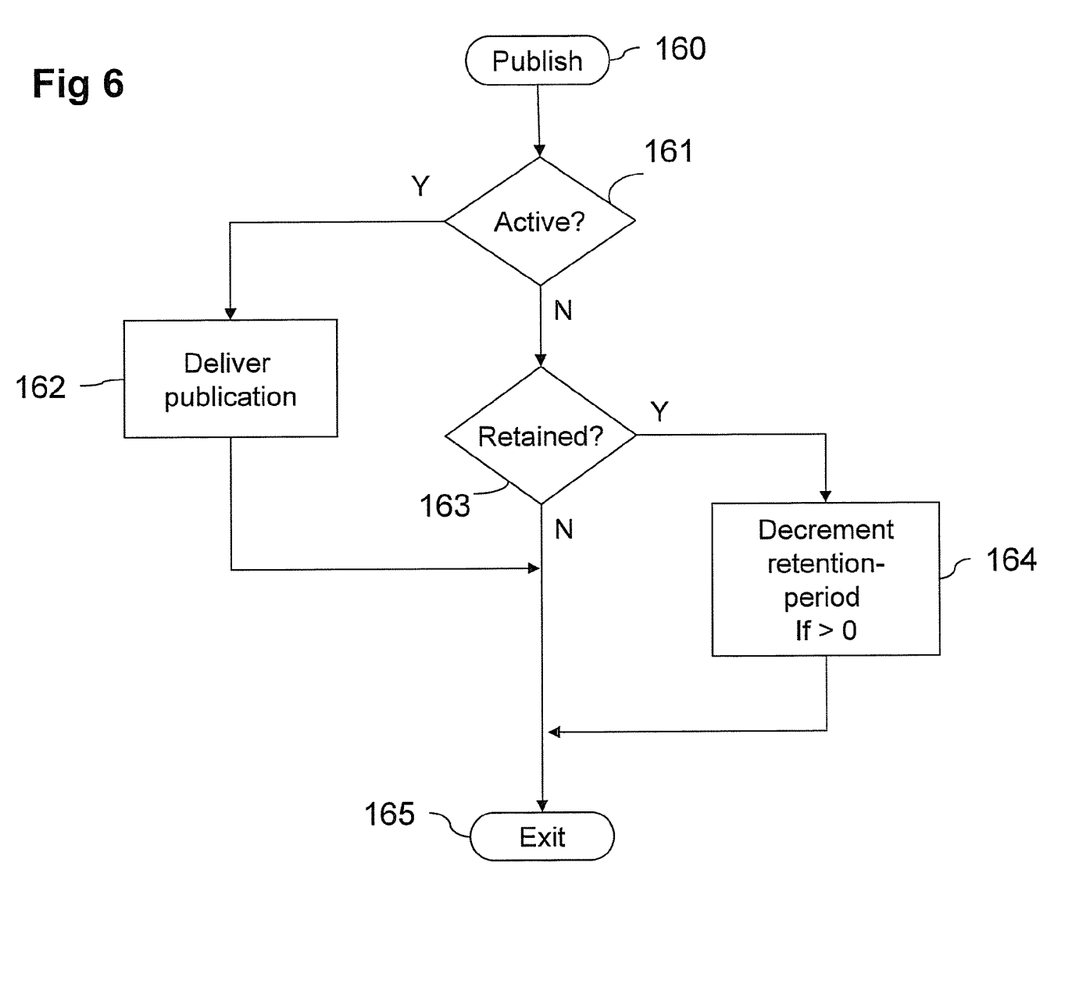
FIG. 6 is a flow diagram illustrating dynamic decrementing of the subscription retention period in response to received publications.

The way in which publications are used to dynamically decrement the retention period for a particular topic subscription is shown in more detail in the flow diagram of FIG. 6. The steps shown correspond to the state changes of boxes 134, 135 and 139 in FIG. 4.

When a publication is received by a broker at input 160, it is first determined in step 161, whether there is a corresponding active subscription. If there is, the publication is published, in step 162, to the listed subscribers and other brokers in the subscription list. This corresponds to the state change box 134 in FIG. 4.

If, instead, the subscription is in a retained state, as determined in step 163, the retention period is decremented in step 164, corresponding to box 139 in FIG. 4. In this case and also in the case where the subscription is inactive or does not exist (corresponding to box 135 in FIG. 4), the publication is not forwarded to other brokers and control exits at 165. The retention period is decremented by the predetermined unit of time, one minute say, only if it has a positive value. Otherwise, it remains zero.

Figure 7:
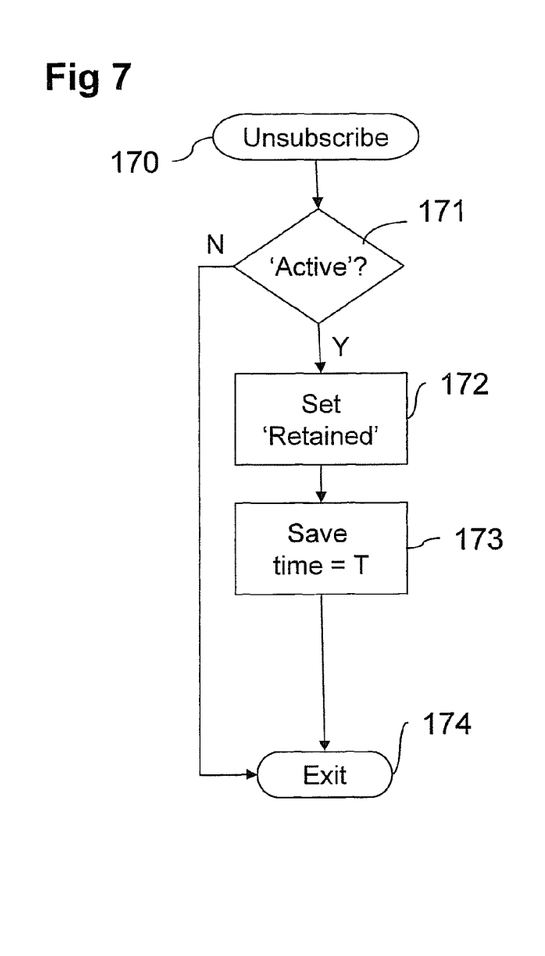
FIG. 7 is a flow diagram showing the establishment of a retained state following an unsubscribe request.
Figure 8:
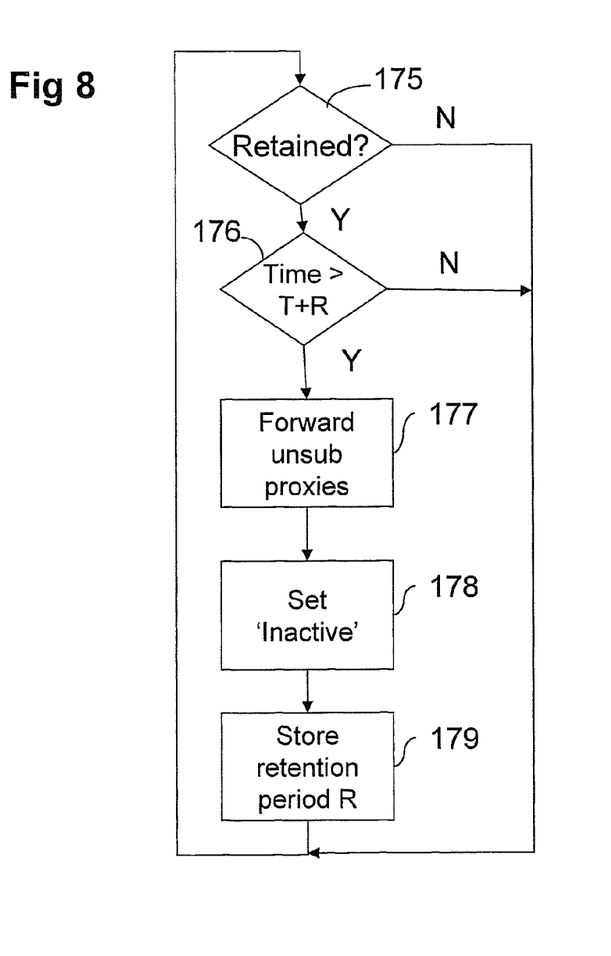
FIG. 8 is a flow diagram showing the forwarding of proxy unsubscriptions after expiry of the retention period.

The handling of unsubscribe requests is illustrated in the flow diagrams of FIGS. 7 and 8. Such requests enter at 170 and it is first determined whether they correspond to Active subscriptions in step 171. If not, control exits immediately at 174. If however, there is an Active subscription, it is set to the Retained state in step 172. The current time T is saved in step 173.

As shown in FIG. 8, whenever the subscription is in the Retained state, as determined in step 175, a test is made in step 176 to see if the current time exceeds T+R, where R is the current retention period. This step is repeated, as long as the subscription is in the Retained state, until the test returns a positive result, at which point the Unsubscribe request is forwarded by proxy in step 177 to listed brokers having an interest in the topic. After this, the subscription is set inactive in the broker's subscription list in step 178. These actions correspond to state changes 136, 137, 138 and 140 in FIG. 4. Finally, the current value of R is stored in step 179 for future reference, should the subscription be repeated. This is better than resetting the retention period to zero as it allows performance to be cumulatively tuned.

The invention can be realized in hardware, software, or a combination of hardware and software. The invention can be realized in a centralized fashion in one computer system, or in a distributed fashion where different elements are spread across several interconnected computer systems. Any type of computer system or other apparatus adapted for carrying out the methods described herein is appropriate. A typical combination of hardware and software can be a general purpose computer system with a computer program that, when being loaded and executed, controls the computer system such that it carries out the methods described herein.

The invention can be embedded in a computer program product, such as magnetic tape, an optically readable disk, or other computer-readable medium for storing electronic data. The computer program product can comprise computer-readable code, defining a computer program, which when loaded in a computer or computer system causes the computer or computer system to carry out the different methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The preceding description of preferred embodiments of the invention have been presented for the purposes of illustration. The description provided is not intended to limit the invention to the particular forms disclosed or described. Modifications and variations will be readily apparent from the preceding description. As a result, it is intended that the scope of the invention not be limited by the detailed description provided herein.

We claim:

1. A publish/subscribe message broker for routing publications from a plurality of publishers to interested subscribers, the broker being capable of interconnection in a network of similar brokers, the broker comprising:
    an input for receiving publications from publishers both directly and via other brokers;
    a controller responsive to the receipt of subscriptions and unsubscriptions from subscribers and from other brokers in the network for publications meeting predefined criteria identified in the subscriptions or unsubscriptions to create and manage a list correlating subscribers with the predefined criteria;
    a matching engine for comparing received publications with the subscription list and forwarding publications which match listed subscriptions which are in an active state to interested subscribers and interested other brokers in the list; and
    an output responsive to received subscriptions and unsubscriptions to generate and forward related proxy subscriptions and proxy unsubscriptions to other brokers;
    wherein the controller is responsive to receipt of an unsubscription from a subscriber or a proxy unsubscription from another broker to put the corresponding subscription in a retained state for a retention period during which matching publications will not be forwarded to the subscriber or other broker and no proxy unsubscriptions will be forwarded to other brokers, a new subscription for the same matching publications as the retained subscription during the retention period causing a reversion of the retained subscription to its active state, whereby propagation of proxy subscriptions and unsubscriptions is reduced in dependence on the duration of the retention period.

2. The message broker of claim 1, wherein the retention period is predetermined and the same for all subscriptions.

3. The message broker of claim 2, wherein the predetermined retention period is adjustable in response to a user input.

4. The message broker of claim 1, wherein the retention period is dynamically adjustable during operation of the broker in response to measured characteristics.

5. The message broker of claim 4, wherein the retention period is increased in response to the frequency of proxy subscriptions received by the broker when not in the retained or active states and for decreasing the retention period in response to the frequency of receipt of redundant publications when in the retained state.

6. The message broker of claim 5, wherein a separate retention period is included for each subscription having unique predefined criteria.

7. The message broker of claim 4, wherein the retention period is adjustable in a range from zero to a period sufficiently long that all publications are published to all brokers for which previous subscriptions have existed.

8. A method of controlling a network of interconnected publish/subscribe message brokers for routing publications from a plurality of publishers to interested subscribers, each message broker being arranged to receive publications from publishers both directly and via other brokers and to receive subscriptions and unsubscriptions from subscribers and other brokers for publications meeting predefined criteria identified in the subscriptions or unsubscriptions, the method comprising performing, via a processor, the steps of:
    creating and managing a list correlating subscribers with the predefined criteria;
    matching received publications with the subscription list and forwarding publications which match listed subscriptions which are in an active state to interested subscribers and interested other brokers in the list; and in response to received subscriptions and unsubscriptions, generating and forwarding proxy subscriptions and proxy unsubscriptions to other brokers;

wherein the method further comprises:

establishing a retention period for subscriptions;

in response to receipt of an unsubscription from a subscriber or a proxy unsubscription from another broker, retaining the corresponding subscription in a retained state for the retention period during which matching publications will not be forwarded to the subscriber or other broker and no proxy unsubscriptions will be forwarded to other brokers; and in response to a new subscription for the same matching publications as the retained subscription during the retention period causing a reversion of the retained subscription to its active state, whereby propagation of proxy subscriptions and unsubscriptions is reduced in dependence on the duration of the retention period.

9. The method of claim 8, further comprising the step of predetermining the retention period.

10. The method of claim 9, wherein the predetermined retention period is adjustable in response to a user input.

11. The method of claim 8, further comprising measuring characteristics of the at least one broker and dynamically adjusting the retention period during operation of the broker in response to the measured characteristics.

12. The method of claim 11, wherein the measuring step includes measuring the frequency of proxy subscriptions received by the at least one broker and measuring the frequency of receipt by the broker of redundant publications not corresponding to any active subscription and the adjustment step increases the retention period for the broker in response to the measured proxy subscription frequency and decreases the retention period in response to the measured frequency of redundant publications received by the broker.

13. The method of claim 12, further comprising a separate retention period for each subscription having unique predefined criteria.

14. The method of claim 11, wherein the retention period can be adjusted in a range from zero to a period sufficiently long that all publications are published to all brokers.

15. A storage medium containing a computer program for controlling a network of interconnected publish/subscribe message brokers for routing publications from a plurality of publishers to interested subscribers, each message broker being arranged to receive publications from publishers both directly and via other brokers and to receive subscriptions and unsubscriptions from subscribers and other brokers for publications meeting predefined criteria identified in the subscriptions or unsubscriptions in a data processing system, the program comprising instructions which, when loaded and executed in the data processing system, causes the brokers to performing the steps of:

creating and managing a list correlating subscribers with the predefined criteria;

matching received publications with the subscription list and forwarding publications which match listed subscriptions which are in an active state to interested subscribers and interested other brokers in the list; and in response to received subscriptions and unsubscriptions, generating and forwarding proxy subscriptions and proxy unsubscriptions to other brokers;

wherein the method further comprises:

establishing a retention period for subscriptions;

in response to receipt of an unsubscription from a subscriber or a proxy unsubscription from another broker, retaining the corresponding subscription in a retained state for the retention period during which matching publications will not be forwarded to the subscriber or other broker and no proxy unsubscriptions will be forwarded to other brokers; and in response to a new subscription for the same matching publications as the retained subscription during the retention period causing a reversion of the retained subscription to its active state, whereby propagation of proxy subscriptions and unsubscriptions is reduced in dependence on the duration of the retention period.

16. The storage medium of claim 15, further comprising the step of predetermining the retention period.

17. The storage medium of claim 16, wherein the predetermined retention period is adjustable in response to a user input.

18. The storage medium of claim 15, further comprising measuring characteristics of the at least one broker and dynamically adjusting the retention period during operation of the broker in response to the measured characteristics.

19. The storage medium of claim 18, wherein the measuring step includes measuring the frequency of proxy subscriptions received by the at least one broker and measuring the frequency of receipt by the broker of redundant publications not corresponding to any active subscription and the adjustment step increases the retention period for the broker in response to the measured proxy subscription frequency and decreases the retention period in response to the measured frequency of redundant publications received by the broker.

20. The storage medium of claim 19, further comprising a separate retention period for each subscription having unique predefined criteria.

* * * * *